United States Patent [19]

Bauer et al.

[11] Patent Number: 4,887,284
[45] Date of Patent: Dec. 12, 1989

[54] METHOD OF CHECKING THE PRESENCE OR ABSENCE OF AN X-RAY SHEET FILM IN A CASETTE INTRODUCED INTO AN APPARATUS FOR UNLOADING OR LOADING A SHEET FILM INTO THE CASSETTE, AND A DEVICE FOR CARRYING OUT THE METHOD

[75] Inventors: Walter Bauer, Munich; Manfred Schmidt, Kirchheim; Ernst Widemann, Dachau, all of Fed. Rep. of Germany

[73] Assignee: AGFA - Gevaert Aktiengesellschaft, Leverkusen, Fed. Rep. of Germany

[21] Appl. No.: 222,123

[22] Filed: Jul. 20, 1988

[30] Foreign Application Priority Data

Aug. 4, 1987 [DE] Fed. Rep. of Germany ....... 3725847

[51] Int. Cl.⁴ .............................................. G03B 42/02
[52] U.S. Cl. .................................... 378/173; 378/185; 271/90; 414/416
[58] Field of Search ................................ 378/172–173, 378/181–182, 185, 188; 271/30.1, 31, 90, 97, 105; 414/416

[56] References Cited

U.S. PATENT DOCUMENTS

| | | | |
|---|---|---|---|
| 4,189,136 | 2/1980 | Robinette | 271/30.1 |
| 4,589,125 | 5/1986 | Schmidt | 378/185 |
| 4,659,929 | 4/1987 | Fujiwara et al. | 378/172 |
| 4,796,285 | 1/1989 | Sakakihara et al. | 378/181 |

FOREIGN PATENT DOCUMENTS

| | | |
|---|---|---|
| 2838058 | 3/1980 | Fed. Rep. of Germany . |
| 3306720 | 9/1983 | Fed. Rep. of Germany . |
| 3230287 | 2/1984 | Fed. Rep. of Germany . |
| 3232187 | 3/1984 | Fed. Rep. of Germany . |
| 2125989 | 3/1984 | United Kingdom ................ 378/185 |

Primary Examiner—Craig E. Church
Assistant Examiner—John C. Freeman
Attorney, Agent, or Firm—Michael J. Striker

[57] ABSTRACT

A method of checking the presence or absence of an X-ray sheet film in a cassette inserted into an automatic film unloading or loading apparatus, utilizes a proximity sensor arranged in the apparatus to sense position changes of a sheet film supporting foil which is arranged for a limited movement in the cassette. The proximity sensor is connected to an electronic control device which controls the operational sequence of the unloading and loading apparatus. When the gripping member preferably in the form of a suction cup seizes a sheet film on the supporting means in the cassette, the supporting means remain in its rest position after the sheet film is removed. However, if no film is present on the supporting means, the suction cup seizes the supporting means and displaces the same from its rest position. This change is sensed by the sensor and a signal is delivered to the electronic control circuit which modifies the operational sequence accordingly.

10 Claims, 4 Drawing Sheets

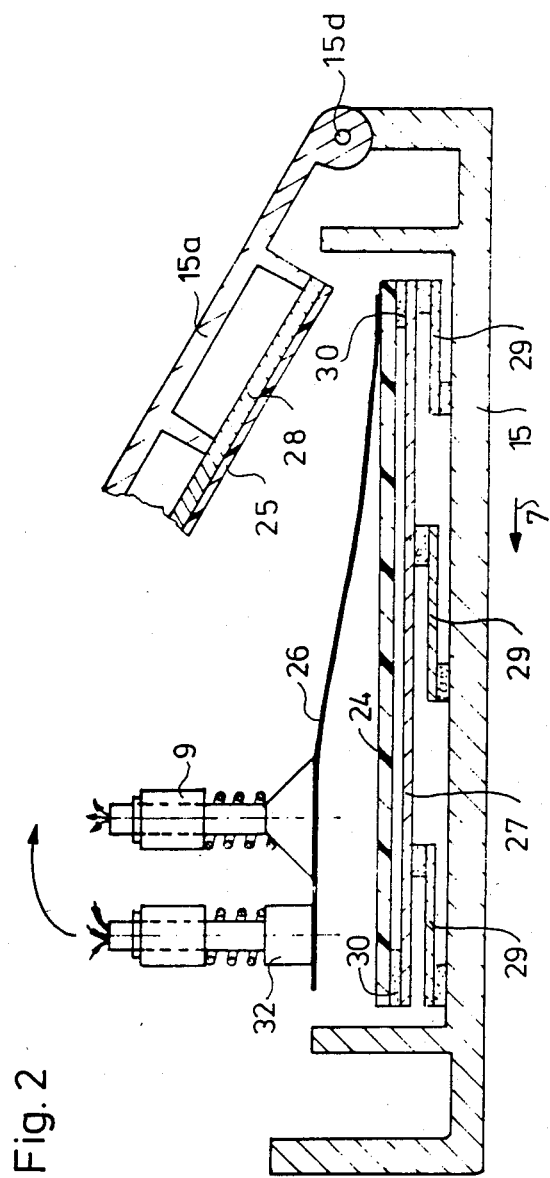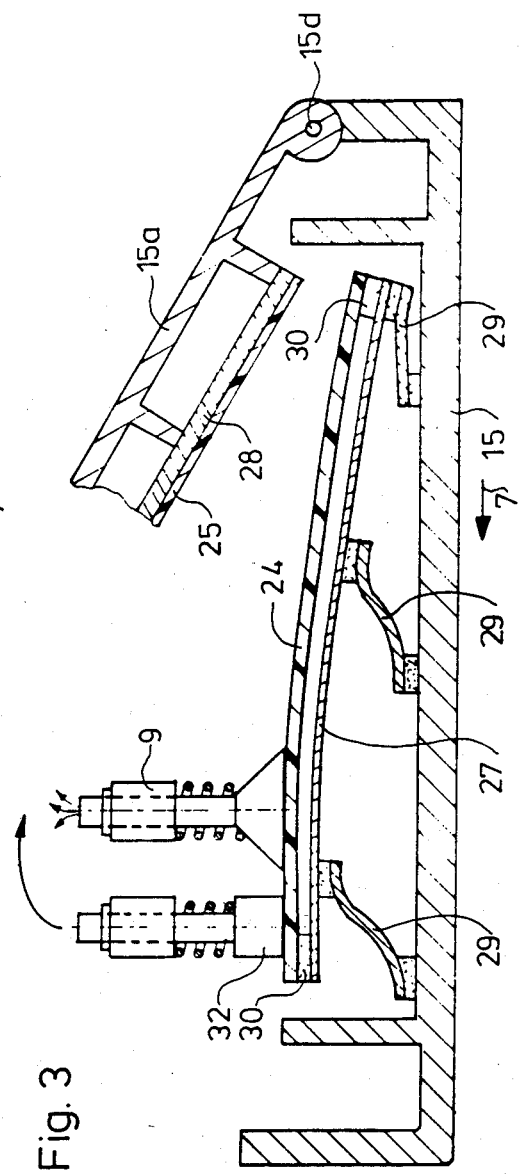

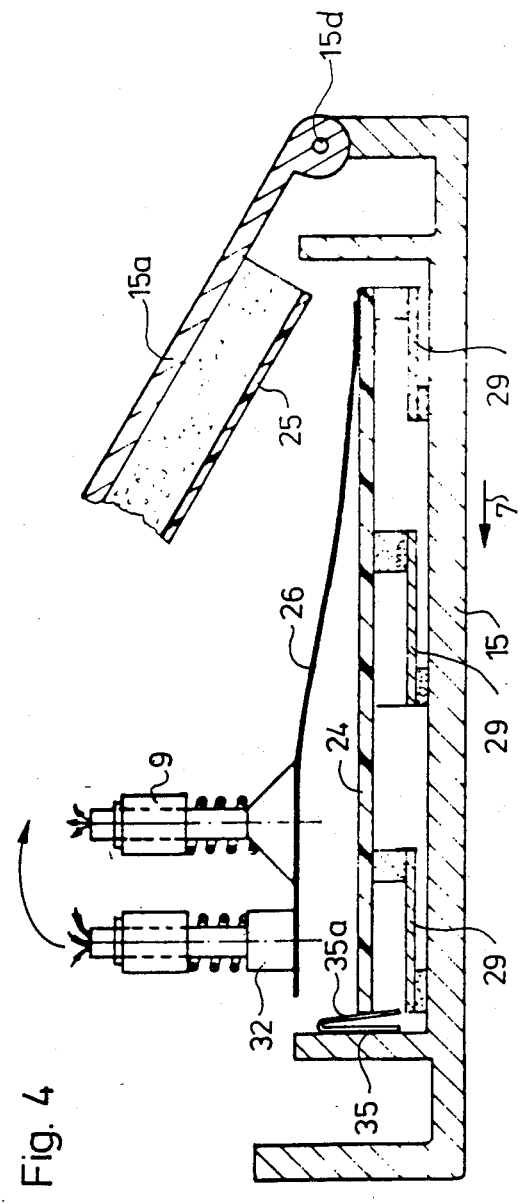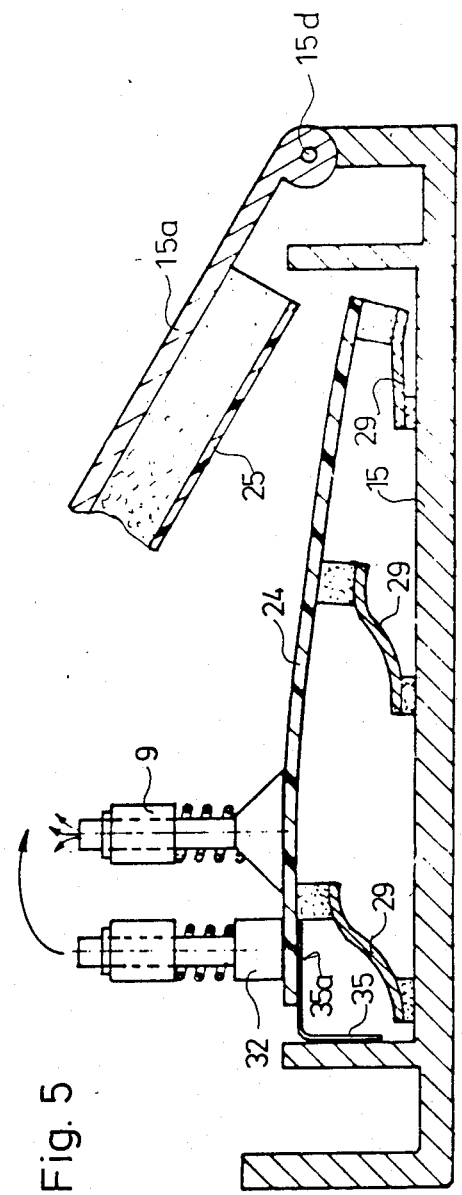

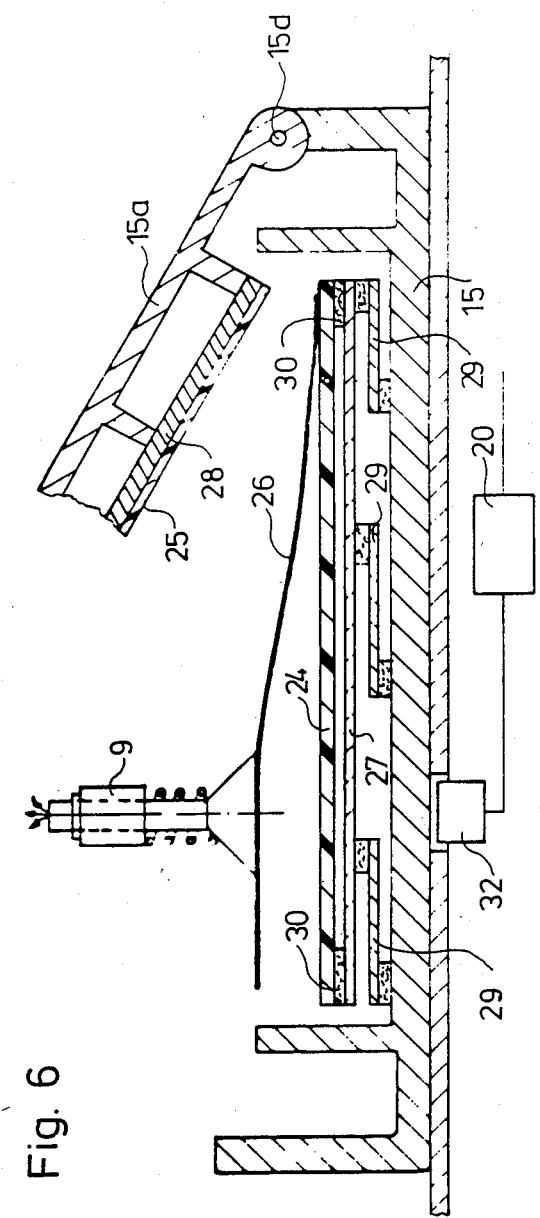
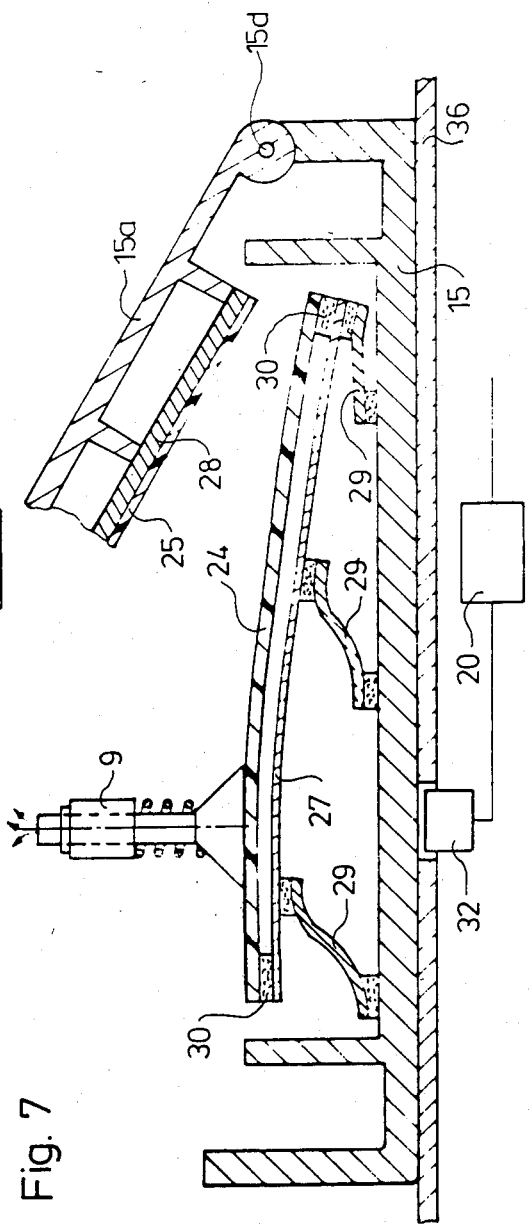
Fig. 6
Fig. 7

METHOD OF CHECKING THE PRESENCE OR ABSENCE OF AN X-RAY SHEET FILM IN A CASETTE INTRODUCED INTO AN APPARATUS FOR UNLOADING OR LOADING A SHEET FILM INTO THE CASSETTE, AND A DEVICE FOR CARRYING OUT THE METHOD

BACKGROUND OF THE INVENTION

The present invention relates to a method for checking the presence or absence of an X-ray sheet film in a cassette which had been inserted and opened in an apparatus for unloading or loading X-ray sheet films from or into the cassette, the cassette including a bottom part and a cover part hinged to a side of the bottom part, whereby an orderly loaded sheet film is deposited on a supporting foil provided with an electrically, magnetically or capacitively active element, and the apparatus including means for gripping the sheet film, such as for example a suction cup, and removing the film from the supporting foil. The invention also relates to a cassette charging and discharging apparatus operating in accordance with the method of this invention.

Apparatuses of the above-described kind for receiving and discharging X-ray film sheet cassettes are known from DE-OS No. 33 06 720 and DE-OS No. 37 12 964 wherein by means of an infrared light reflecting sensor the bottom of a cassette, opened after its insertion into the apparatus, is sensed. The disadvantage of the first-mentioned prior art device is its relatively low operational reliability because the difference between the reflection from the film and the amplifying foil which is utilized for determining the presence or the absence of a film, is too small. The second-mentioned device in order to eliminate this shortcoming provides a special reflector in a surface area of the amplifying foil in the path of propagation of the infrared light. This design, however, has the disadvantage that cassettes which are not provided with a reflector cannot be used.

Known are also X-ray sheet film cassettes wherein a steel foil or a magnetic foil is arranged in the bottom part of the cassette below the amplifying foil, the amplifying foil being glued to the steel foil at discrete points only and both foils being flexibly mounted in the bottom part of the cassette so as to be movable within certain limits. Cassettes of this kind have been described in DE-PS No. 32 30 287 and in practice are used in connection with a cassette unloading or loading apparatus according to DE-PS No. 32 32 187, for example. In this arrangement a sensor or scanning device is provided which detects whether a film is present in a cassette inserted into the unloading or loading apparatus, or not. The sensing or scanning is functionally reliable due to the fact that the cassettes are provided with an indicator knob which signals at the outside whether a sheet film is present in the cassette, that is it includes an additional feature according to the DE-PS No. 28 38 058. The indicator knob is particularly useful during an X-ray picture taking because the user can immediately recognize on the closed cassette whether it contains a film. The sensing or scanning of the indicator knob in the cassette unloading and loading apparatus is not only mechanically expensive, but has also the disadvantage that the sensing of the indicator knob on the outer surface of the cassette does not recognize whether during the opening of the cassette the film among other possibilities does not adhere to the cover of the cassette and consequently is not available in the bottom part for removal and thus a malfunction may result.

SUMMARY OF THE INVENTION

It is an object of the invention to provide a checking method of the afore-described kind or an apparatus for unloading or loading X-ray sheet film cassettes which is provided with a checking apparatus for determining whether a sheet film is present in the inserted cassette whereby conventional X-ray sheet film cassettes provided in their bottom part with a metal foil (magnetic counterfoil) or rays amplifying foil connected to a magnetic foil and being supported for a limited movement within the bottom part, can be used without any modifications.

In keeping with these objects and others which will become apparent hereafter, one feature of this invention resides in the steps of activating a sheet film gripping element such as, for example, a suction cup to engage the sheet film supporting amplifying foil whereby in the absence of a sheet film on the foil the gripping element lifts the foil together with its magnetically or capacitively active member a predetermined distance away from the bottom part of the cassette into or out of the range of a proximity sensing switch which delivers a signal indicative of the position change of the supporting foil to an electronic control circuit which controls the operation of the X-ray cassette unloading and loading apparatus.

The invention has the advantage that instead of conventional mechanical scanning or feeling mechanisms or an infrared reflection sensor only a simple proximity sensing switch of conventional design such as for example an induction proximity switch or a Hall probe are used and connected to the existing electronic control device of the cassette unloading and loading apparatus to deliver therein control signals corresponding to the position changes of the sheet film supporting amplifying foil.

The novel features which are considered as characteristic for the invention are set forth in particular in the appended claims. The invention itself, however, both as to its construction and its method of operation, together with additional objects and advantages thereof, will be best understood from the following description of specific embodiments often read in connection with the accompanying drawing.

BRIEF DESCRIPTION OF THE DRAWING

FIG. 2 is a sectional side view of a cutaway part of a cassette for use in the apparatus of FIG. 1, shown on an enlarged scale with those parts of the apparatus which are necessary for carrying out the method of the invention and with an X-ray sheet film present in the cassette;

FIG. 3 is a view similar to FIG. 2 but shown with a cassette without an X-ray sheet film;

FIGS. 4 and 5 show a modification of a cassette of FIGS. 2 and 3; and

FIGS. 6 and 7 illustrate a modification of the film unloading and loading apparatus of FIGS. 2 through 5.

DESCRIPTION OF THE PREFERRED EMBODIMENTS

Figure 1:
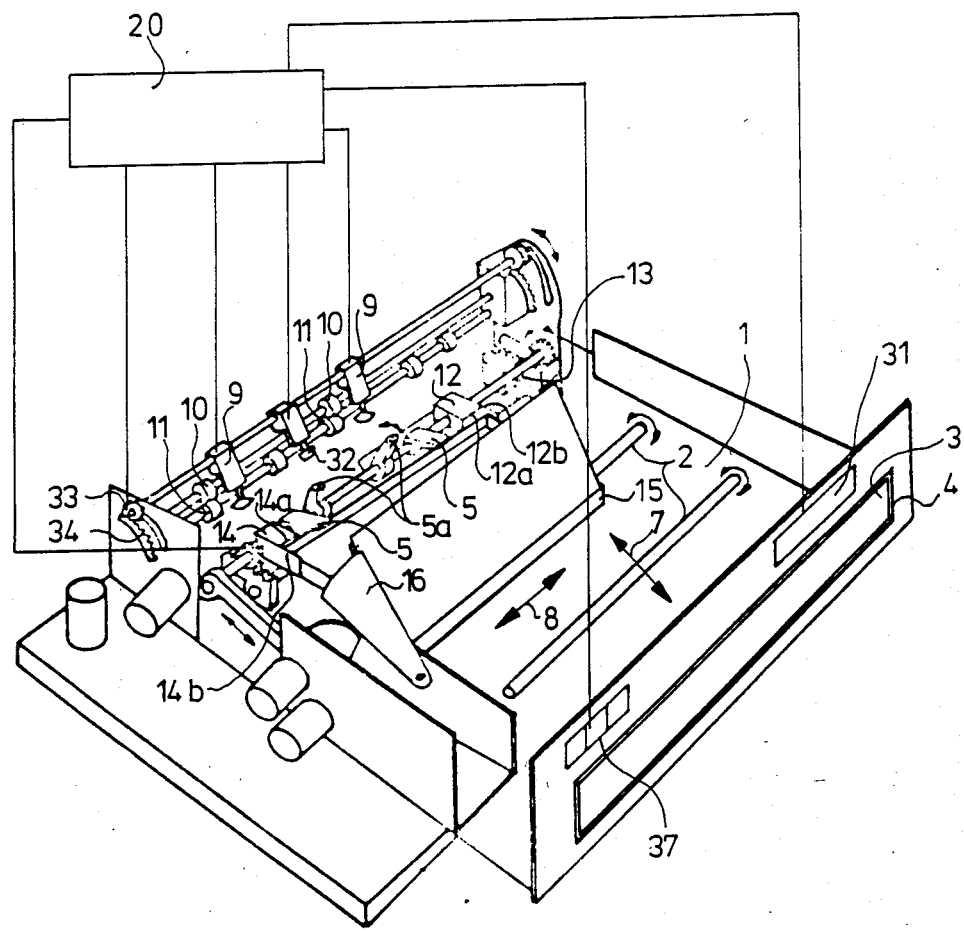
FIG. 1 is a schematic perspective view of essential parts of the apparatus for unloading/loading X-ray sheet film cassettes according to the invention.

Referring to FIG. 1, there is illustrated for the purpose of explaining the invention an apparatus for unloading and loading sheet film cassettes according to the DE-PS No. 32 32 187. However, the present invention is applicable for other types of sheet film cassette unloading and loading apparatuses operating on a similar principle and for all cassettes having an openable cover. In the following description only those features of such prior art cassette unloading and loading apparatuses are mentioned which are essential for understanding the exemplary embodiment of this invention.

The cassette unloading and loading apparatus includes a compartment 1 for receiving a single cassette at a time, transporting means 2 for inserting and discharging the cassette and being preferably in the form of transporting rollers arranged on the bottom of compartment 1. Reference numeral 3 indicates schematically illustrated means for light tight closing an inlet opening 4 of compartment 1. The opposite end wall of compartment 1 is provided with known means 5, 5a for unlocking, opening and closing a cassette which has arrived against a stop surface as it will be explained later. The unlocking and closing means can be for example of the type which includes sliding pieces 5 provided with non-illustrated teeth by means of which a latch or lock of the cassette is engaged and thereafter by moving the sliding piece transversely relative to cassette feeding direction 7 the lock is released and the hinged cassette cover is swung open for example by the action of a weak spring or by means of a rotatable lateral lifting part 16 provided with a corresponding hook.

One of the opening sliding pieces 5 is shiftable in the direction 8 transverse to the cassette feeding direction 7 in such a manner that it can be automatically adjusted for opening cassettes of different formats. Above and/or behind the cassette opening means 5 are arranged known means 9, 10, 11 for retrieving a sheet film from the cassette and for inserting a new sheet film into the cassette. Such film unloading and loading means consist of suitably arranged suction cups 9 cooperating with assigned transport roller pairs 10 and 11 controlled by an electronic control device 20. In addition, there are provided in conventional manner and therefore non-illustrated sheet film supply magazines which contain films of different formats to be loaded into cassettes of corresponding formats which had been introduced into the unloading and loading apparatus. Moreover, there is provided also a non-illustrated intermediate magazine for collecting sheet films removed from the cassette or there can be directly connected a film developing machine for immediate processing of the discharged films.

The determination of the format of an inserted cassette and the selection and supply of a matching new sheet film is carried out automatically for example after an automatic measurement of at least one side of the cassette. Prior to or during the size determination of a cassette the latter is accurately positioned within the compartment. The positioning is accomplished by a shifting device which is movable back and forth in the direction of double arrow 8 transversely to the cassette feeding direction 7. The transverse shifting device includes a clamping jaw 12 in the form of a rectangular piece 12a, 12b which is coupled with other shiftable parts used for the positioning of the cassette 15 as it will be described below. The shiftable clamping jaw 12 moves in the transverse direction 8 relative to a fixed clamping jaw 14 which has also the form of a rectangular clamping piece 14a, 14b. The inner surfaces of the legs 14a, 14b of the fixed clamping jaw act as the lateral and front stop surfaces for cassette 15 which had been introduced into the compartment 1 by the transport rollers 2. Both clamping jaws 12 and 14 are aligned in the transverse direction 8 on a rod 13 such that the lateral clamping legs 12a and 14a are in alignment. By shifting the movable clamping jaw 12 against the fixed one the cassette with the assistance of transporting rollers 2 is brought into abutment against the stop surfaces 14a and 12a and clamped by the lateral legs 14b and 12b into a fixed position. The end abutment or stop surfaces 14a and 12a are provided with non-illustrated switching contacts which if cassettes of greatly differing formats are to be processed, can be also arranged between the clamping jaws to switch on the drive for the shiftable clamping jaw 12 after being activated by pressure of a new cassette 15. Additional sensing switches for determining the format of a newly inserted cassette can be in the form of light barriers or microswitches which during the transporting and positioning movement of the cassette detect the size of the latter and generate a corresponding signal delivered to the electronic control device 20. Of course, any suitable design for determining the cassette format and for advancing the cassette into a predetermined position in the compartment can be used.

As known from prior art, it is advantageous when a cassette 15 having a tiltable or liftable cover 15a is displaced from a first stop position in which the transverse shifting member 12 is turned on into a second stop position in which the cover 15a is opened by the lifting device 16 and the sheet film in the cassette is removed by suction cup 9 and a new sheet film is inserted into the bottom part of the cassette 15. As mentioned before, a pair of transporting rollers 10 and 11 located immediately before the front side of the positioned cassette, serve for transporting away the exposed film and for the subsequent feeding of the new sheet film. The position of the cassette during the film loading and unloading operation remains unchanged.

FIGS. 2 and 3 illustrate an X-ray sheet film cassette shown in its open position during its film discharging operation in an apparatus for unloading and loading the films. The cassette has a bottom part 15 and a tiltable cover 15a connected to a lateral side of the bottom part by a hinge 15b. The contact surfaces of the bottom part 15 and cover part 15a are provided in conventional manner with circumferential labyrinth-like ribs which in closed condition of the cassette engage into one another. The bottom surface of the bottom part 15 supports for a limited lift movement the radiation amplifying foil 24 which frequently is secured to an underlying magnetic counterplate or magnetic plate 27. Similarly, the cover part 15a is frequently equipped with a pressure pad of foam rubber on which a magnetic plate 28 or a magnetic counterplate is mounted and another amplifying foil 25 is attached to the upper surface of the magnetic plate 28 so that an X-ray sheet film 26 in closed condition of the cassette is pressed between the two amplifying foils 24 and 25.

As known from the DE-PS No. 32 30 287, the mounting elements between the bottom surface of the bottom part 15 and the lower side of the magnetic counterplate 27 or the amplifying foil 24 (FIGS. 4 and 5) are in the form of flexible foils or strips 29 connected at one end thereof to the bottom part 15 and at the opposite end to the magnetic plate 27 or to the foil 24. The attachment points of respective flexible strips in the lowermost position of the film supporting assembly 27 and 24 do not lie opposite each other but are offset in horizontal direction. As see from FIGS. 2 and 3 or 6 and 7, the magnetic counterplate 27 and the amplifying foil 24 are attached to one another at separate areas by adhesive tape 30. In a modification, they can be also glued together over their entire surface. Due to the offset relation of connection points at the ends of flexible mounting strips 29, the assembly of the amplifying foil 24 and counterplate 27 is movable and particularly liftable within certain limits in the bottom part 15. The movable arrangement of the assembly has originally served for achieving an improved pressing effect on sheet film deposited on the amplifying foil. According to the invention the movable connection of the film supporting assembly has been found advantageous for determining the presence or absence of a film 26 in the cassette. It will be noted that the moving attachment of the amplifying foil 24 or of the assembly of an amplifying foil with a magnetic counterplate 27 can be achieved by other suitable means known in the art, for example, by the provision of a foil which adheres to the magnetic plate over a large area but which at its marginal part is not connected to the bottom part of the cassette so as to permit an upward sloping movement of the plate. The illustrated movable attachment by means of the tiltable foil strips 29, however, has the advantage that the assembly of the amplifying foil with the counterplate (or magnetic plate) is liftable perpendicularly to the plane of the bottom part by conventional suction caps 9 and at the same time during the film discharging operation is also slightly displaceable in horizontal direction by non-illustrated frictional rollers.

As it has been already described in the DE-OS No. 37 12 964 it is desired that the cassette unloading and loading apparatus according to FIG. 1 be capable of performing the following checking functions:

If the operator issues via the control keyboard 37 an instruction to unload and reload a cassette and if it is detected that no X-ray sheet film 26 is deposited on the amplifying foil 24, then it is desired for example that the inserted cassette be again closed and discharged from the unloading and loading apparatus and a message should appear on the display screen 31 that no film has been detected in the cassette. Then the user can checkup in a conventional film indicating device whether really no film was present in the closed discharged cassette or whether the sheet film had stuck on the cover and therefore was not available for the removal. In the first case, the user reinserts the cassette once more in the unloading and loading apparatus with the instruction that only film loading should be executed. In the second case the cassette is reloaded with the instruction for the film unloading and if desired for loading a new film. In the event that the film has again stuck to the lid then the cassette is once more closed and transported out of the unloading and loading apparatus and the film must be removed in a dark chamber.

An analogous operational course takes place after the instruction for reloading a cassette. If the latter is unloaded or inserted into the apparatus without film and if the film format is determined and a corresponding film loaded into the cassette then the control device 20 automatically initiates new film checking operation. If it is ascertained that the amplifying foil 24 is covered by a new film 26 then the cassette is automatically closed and discharged from the unloading and loading apparatus and a new message "loaded" appears on the display field 31. However, if no film of suitable format is available in the corresponding supply magazine or if a transportation interference occurs during the loading then the display shows a message that the cassette is not reloaded. The user is thus notified that a loading error has occurred.

In testing the presence or absence of a sheet film on the amplifying foil 24 a method according to the invention is used which requires only a very simple modification on the part of the apparatus, namely the provision of a proximity sensing switch 32 arranged at a suitable location close to the path of movement of one of the suction cups 9. Provided that a counterfoil 27 of steel or a magnetic foil is employed in the film supporting assembly, then the proximity sensing switch can be a magnetic induction switch. When a magnet is used in connection with the amplifying foil 24 then the proximity sensing switch 32 can be in the form of a Hall probe.

In the embodiments of FIGS. 1 to 3, the proximity sensing switch 32 is arranged on the same tilting and driving mechanism 33, 34 in line with the suction cups 9. In FIGS. 2 through 5, however, the proximity switch is illustrated in a position turned by 90° for the sake of clarity. In principle it is also possible to modify the arrangement of the switch 32 in the apparatus of FIG. 1 such as to correspond with the position illustrated in FIGS. 2 to 5, that means the switch is arranged behind the suction cup 9 when viewed in the cassette feeding direction 7.

Referring now to FIGS. 1 to 3, the method for checking the presence or absence of a film in an open cassette 15 will be explained in detail. In a first step, the suction cups 9 together with the proximity sensing switch 32 are moved in the direction against the cassette bottom part 15 and the suction cup 9 is activated. Accordingly, it engages by suction either sheet film 26 when present on the supporting assembly or it sucks on the film supporting assembly only, that means on amplifying foil 24 and the underlying counter foil 27 when no film is present. In either case during the attachment by suction the proximity sensing switch 32 is brought in the range of the magnetic counterfoil 27 and undergoes a corresponding change of its switching condition which is signalled to the control device 20. Then the suction cups 9 and proximity sensing switch are lifted back as shown in FIGS. 2 and 3. If an X-ray film 26 was present on the amplifying foil 24 then only the film alone is lifted by the suction cup as illustrated in FIG. 2. During the return movement the proximity sensing switch 32 is removed from the induction range of the counterfoil 27 and returns to its initial switching state. The signal due to the second condition change is again delivered to the electronic control circuit 20 and this signal is evaluated as an indication of the presence of a film 26 in the cassette and this detected condition triggers further operation of the apparatus.

If no film is present on the amplifying foil 24 then as illustrated in FIG. 3 the suction cup 9 lifts the supporting assembly of the interconnected amplifying foil 24 and the counterfoil 27. Accordingly, the proximity sensing switch 32 remains in the induction range of the steel counterfoil 27. After reaching a predetermined height during the lifting movement, the control device 20 recognizes that the second condition change of the proximity sensing switch 32 is missing and accordingly that no film 26 was deposited on the amplifying foil 24 and then triggers the desired, beforedescribed sequence of functions of the apparatus. This operational sequence can be preset in the control device 20 during the insertion of a loaded cassette 15 into the apparatus. After the reloading of a film the sensing action is again repeated by the control circuit 20 so long until the second change of the switching condition of the proximity sensing switch is detected to indicate whether a new film 26 has been properly positioned into the cassette. Then the suction cup 9 is turned off and together with the proximity sensing switch 32 is returned into its starting position so that the sheet film 26 as well as the amplifying foil 24 and the counterplate 27 return into their operative or rest position in the cassette bottom part 15, the cassette is then closed and discharged from the apparatus and a message appears on the screen of the indicating device 31 showing whether the cassette is newly loaded or not.

The construction of a cassette according to FIGS. 4 and 5 differs from the embodiment of FIGS. 2 and 3 in that no counterplate or magnetic plate is arranged under the amplifying foil 24. Such a type of a cassette is also available and in order to make it usable for the method of this invention performed in the apparatus according to FIG. 1 it has to be modified in such a manner that an induction producing element is arranged in the range of movement of the proximity sensing switch 32. When the amplifying foil 24 is attached by suction to the suction cup 9 the element causes the change of switching condition of the switch. This can be done simply in such a manner that a strip of a magnetizable metal or a magnet is glued to the amplifying foil 24 in the region of its leading edge opposite the proximity sensing switch. In another modification, a thin leaf spring 35 of an hairpin-like cross-section is glued on the inner wall of the cassette bottom part at such a location that in the normal or rest position of the amplifying foil (FIG. 4) the arms of the spring are pressed toward each other by the leading edge of the foil. However, when in the absence of a film the amplifying foil 24 is engaged by the suction cup 9 and lifted, then the free arm 35a of the leaf spring 35 engages the bottom side of the foil 24 (FIG. 5). Accordingly, the proximity sensing switch 32 due to the proximity of the arm 35a changes its switching condition whereas when only the sheet film 26 is lifted by the suction cup 9, no change of the switching state occurs. If this type of cassettes is used, then the control program in the circuit 20 must be correspondingly modified so as to be able to control the processing of both types of cassettes.

Referring to FIGS. 6 and 7 there is illustrated another embodiment of the arrangement of the proximity sensing switch 32 for carrying out the method of the invention. In this embodiment the proximity sensing switch is fixedly mounted in the bottom 36 of the compartment 1 of the apparatus at a point where the film supporting assembly of the amplifying foil 34 and magnetically active counterfoil 27 is lifted by the suction cup 9. In this embodiment the proximity sensing switch 32 remains in the induction range of the magnetic counterfoil 27 when the supporting assembly is in its normal or rest position and undergoes a change of its switching state only then when the supporting assembly is lifted. A corresponding change of the program of the control circuit 20 of course is also necessary.

If a cassette is of a design where the walls of the compartment provided with the labyrinth in the bottom part 15 are relatively low with respect to the rest position of the film supporting assembly, then friction rollers can be used for transporting the sheet film out of the cassette. In this embodiment, the film supporting amplifying foil 24 and the associated inductively or capacitively active elements 27 are supported for a substantially more limited movement both in the vertical and in the horizontal directions. The proximity sensing switch in this case must be adjusted to respond to this limited position changes of the amplifying foil and its inductive or capacitive element.

While the invention has been illustrated and described as embodied in specific embodiments of an X-ray film cassette and a film loading or unloading apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determining the presence or absence of an X-ray sheet film in a cassette introduced into an apparatus for unloading or loading a sheet film from or into the cassette, the cassette including a bottom part and an openable cover part, sheet film supporting means arranged in said bottom part and being mounted for a limited movement in vertical and horizontal directions from a rest position thereof and including an inductively or capacitively active element, the unloading or loading apparatus including a movable gripping member provided for seizing a sheet film on the supporting means and displace the sheet film out of said bottom part when activated, the method comprising the steps of activating said gripping element to seize said sheet film and lift the sheet film away from said supporting means or in the absence of the sheet film to grip said supporting means and displace said supporting means in the horizontal and vertical directions within the range of their limited movement, sensing the position change of said inductively or capacitively active element on said supporting means, and generating a control signal indicative of the absence of a sheet film on said supporting means when a position change of inductively or capacitively active element is detected.

2. A method as defined in claim 1, wherein said supporting means includes a radiation amplifying foil for supporting said sheet film, said gripping member being a suction cup supported for movement in said unloading and loading apparatus, the amplifying foil being connected to said inductively or capacitively active element, and a proximity sensing switch being arranged in said unloading and loading apparatus to detect the position of said element and the presence or the absence of the sheet film in said cassette.

3. A method as defined in claim 2, wherein said proximity sensing switch is moved jointly with said suction cup such that upon engagement of the suction cup with the sheet film the proximity sensing switch closes and upon lifting the sheet film away from the supporting means the proximity switch reopens or in the absence of a sheet film and after lifting of the supporting means the proximity sensing switch remains closed.

4. A method as defined in claim 2, wherein said proximity sensing switch is arranged at a fixed location in said cassette bottom part under said film supporting means so that prior to the actuation of said suction cup said proximity sensing switch is closed, after the lifting of sheet film said proximity sensing switch remains closed and after the lifting of the amplification foil together with the inductively or capacitively active element said proximity sensing switch opens.

5. A method as defined in claim 2, wherein said proximity sensing switch is arranged at a fixed position above said cassette bottom part and prior to the actuation of suction cup said proximity sensing switch is open, after the removal of a sheet film it remains open, and in the event of the movement of the amplification foil and said inductively or capacitively active element said proximity sensing switch closes.

6. An apparatus for unloading or loading a X-ray sheet films into a cassette which includes a bottom part, an openable cover part hinged to the bottom part, sheet film supporting means arranged, in a rest position, in said bottom part and being mounted for a limited movement in vertical and horizontal directions and including an inductively or capacitively active element, the apparatus comprising a movable gripping member arranged for seizing a sheet film on said supporting means and displacing said sheet film out of said cassette when activated, an electronic control device for controlling the unloading and loading operation of the apparatus, a device for determining the presence or absence of an X-ray sheet film in a cassette after insertion of said cassette into the apparatus, said device including a proximity sensing switch arranged for detecting the position changes of said inductively or capacitively active element of said film supporting means and being connected to said electronic control device to control the operational sequence of said apparatus such that when said movable gripping element seizes a film present on said supporting means and lifts the film out of said bottom part of the cassette, the position of said supporting means together with said inductively or capacitively active element remains unchanged and no position change of the inductively or capacitively active element is signalled whereas in the absence of the film on the supporting means said gripping element seizes said supporting means and moves said supporting means together with said inductively or capacitively active element out of a rest position thereof so that the proximity switch senses the position change of the inductively or capacitively active element and delivers a corresponding signal to said electronic control device.

7. An apparatus as defined in claim 6, wherein said gripping member includes at least one suction cup movable by a driving mechanism; and said proximity sensing switch being arranged on said driving mechanism for joint movement with said suction cup.

8. An apparatus as defined in claim 6, wherein said proximity sensing switch is fixedly arranged in said apparatus below said cassette bottom part.

9. An x-ray cassette unloading system comprising a cassette and an apparatus for unloading or loading a X-ray sheet films said cassette which includes a bottom part, an openable cover part hinged to the bottom part, sheet film supporting means arranged, in a rest position, in said bottom part and being mounted for a limited movement in vertical and horizontal directions and including an inductively or capacitively active element, the apparatus comprising a movable gripping member arranged for seizing a sheet film on said supporting means and displacing said sheet film out of said cassette when activated, an electronic control device for controlling the unloading and loading operation of the apparatus, a device for determining the presence or absence of an X-ray sheet film in a cassette after insertion of said cassette into the apparatus, said device including a proximity sensing switch arranged for detecting the position changes of said inductively or capacitively active element of said film supporting means and being connected to said electronic control device to control the operational sequence of said apparatus such that when said movable gripping element seizes a film present on said supporting means and lifts the film out of said bottom part of the cassette, the position of said supporting means together with said inductively or capacitively active element remains unchanged and no position change of the inductively or capacitively active element is signaled whereas in the absence of the film on the supporting means said gripping element seizes said supporting means and moves said supporting means together with said inductively or capacitively active element out of a rest position thereof so that the proximity switch senses the position change of the inductively or capacitively active element and delivers a corresponding signal to said electronic control device and wherein said sheet film supporting means includes an assembly of radiation amplifying foil and a magnetic foil or a counterfoil of metal secured to a lower side of said amplifying foil.

10. An x-ray cassette unloading system comprising a cassette and an apparatus for unloading or loading a X-ray sheet films into said cassette which includes a bottom part, an openable cover part hinged to the bottom part, sheet film supporting means arranged, in a rest position, in said bottom part and being mounted for a limited movement in vertical and horizontal directions and including an inductively or capacitively active element, the apparatus comprising a movable gripping member arranged for seizing a sheet film on said supporting means and displacing said sheet film out of said cassette when activated, an electronic control device for controlling the unloading and loading operation of the apparatus, a device for determining the presence or absence of an X-ray sheet film in a cassette after insertion of said cassette into the apparatus, said device including a proximity sensing switch arranged for detecting the position changes of said inductively or capacitively active element of said film supporting means and being connected to said electronic control device to control the operational sequence of said apparatus such that when said movable gripping element seizes a film present on said supporting means and lifts the film out of said bottom part of the cassette, the position of said supporting means together with said inductively or capacitively active element remains unchanged and no position change of the inductively or capacitively active element is signaled whereas in the absence of the film on the supporting means said gripping element seizes said supporting means and moves said supporting means together with said inductively or capacitively active element out of a rest position thereof so that the proximity switch senses the position change of the inductively or capacitively active element and delivers a corresponding signal to said electronic control device and wherein said inductively or capacitively active element is in the form of a U-shaped weak leaf spring comprising one arm secured to an inner side wall of said cassette and a free arm which engages an edge of said sheet film supporting means so that upon lifting of the supporting means by said gripping member the free arm resiliently engages a lower side of said film supporting means opposite said proximity sensing switch.

* * * * *